United States Patent
Sim et al.

(10) Patent No.: US 9,606,666 B2
(45) Date of Patent: Mar. 28, 2017

(54) METHOD AND APPARATUS FOR PROVIDING INTEGRATED INTERFACE IN CENTER FASCIA

(71) Applicant: HYUNDAI MOTOR COMPANY, Seoul (KR)

(72) Inventors: Won Seon Sim, Seongnam-si (KR); Soo Ryun Kim, Hwaseong-si (KR); Jong Won Hwang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 129 days.

(21) Appl. No.: 14/586,835

(22) Filed: Dec. 30, 2014

(65) Prior Publication Data

US 2016/0117038 A1    Apr. 28, 2016

(30) Foreign Application Priority Data

Oct. 27, 2014   (KR) ........................ 10-2014-0146123

(51) Int. Cl.
| | |
|---|---|
| *G06F 3/041* | (2006.01) |
| *G06F 3/02* | (2006.01) |
| *G09G 5/00* | (2006.01) |
| *B60K 35/00* | (2006.01) |
| *G06F 3/038* | (2013.01) |

(52) U.S. Cl.
CPC ............ *G06F 3/0416* (2013.01); *B60K 35/00* (2013.01); *G06F 3/0227* (2013.01); *G06F 3/038* (2013.01); *G09G 5/003* (2013.01)

(58) Field of Classification Search
CPC ........ B60K 35/00; B60K 37/00; B60K 41/00; G09G 5/003; G06F 3/0227; G06F 3/0416

USPC .......................................................... 701/36
See application file for complete search history.

(56) References Cited

U.S. PATENT DOCUMENTS

| | | | | |
|---|---|---|---|---|
| 2004/0163395 | A1* | 8/2004 | Ichishi ............... | B60H 1/00735 62/126 |
| 2009/0098815 | A1* | 4/2009 | Hotary ............... | B60H 1/00742 454/75 |
| 2012/0268294 | A1* | 10/2012 | Michaelis ............. | G06F 9/4443 340/905 |

(Continued)

FOREIGN PATENT DOCUMENTS

| | | |
|---|---|---|
| JP | 2006-001305 A | 1/2006 |
| JP | 2006-092830 A | 4/2006 |

(Continued)

OTHER PUBLICATIONS

Korean Office Action dated Oct. 5, 2015 issued in Korean Patent Application No. 10-2014-0146123.

*Primary Examiner* — Tyler J Lee
(74) *Attorney, Agent, or Firm* — McDermott Will & Emery LLP

(57) ABSTRACT

A method of providing an integrated module in a human machine interface (HMI) module in a vehicle includes sensing a switch input signal on a center fascia panel, identifying a switch type based on the sensed switch input signal, identifying an input signal corresponding to the sensed switch input signal and the identified switch type, and identifying an output signal corresponding to the identified input signal, and transmitting the identified output signal to an associated main controller through a communication network in the vehicle.

13 Claims, 5 Drawing Sheets

(56) References Cited

U.S. PATENT DOCUMENTS

| | | | | |
|---|---|---|---|---|
| 2013/0093860 A1* | 4/2013 | Shimotani | ............ | G01C 21/265 348/51 |
| 2015/0268746 A1* | 9/2015 | Cuddihy | ................ | G06F 3/041 345/173 |
| 2015/0370405 A1* | 12/2015 | Oda | ..................... | G06F 3/0416 715/771 |

FOREIGN PATENT DOCUMENTS

| | | |
|---|---|---|
| JP | 2009-126357 A | 6/2009 |
| KR | 20-0422515 Y1 | 7/2006 |
| KR | 10-2010-0112735 A | 10/2010 |
| KR | 10-2012-0074020 A | 7/2012 |
| KR | 10-2014-0087209 A | 7/2014 |
| WO | 2012-173732 A1 | 12/2012 |

\* cited by examiner

FIG. 1 --Related Art--
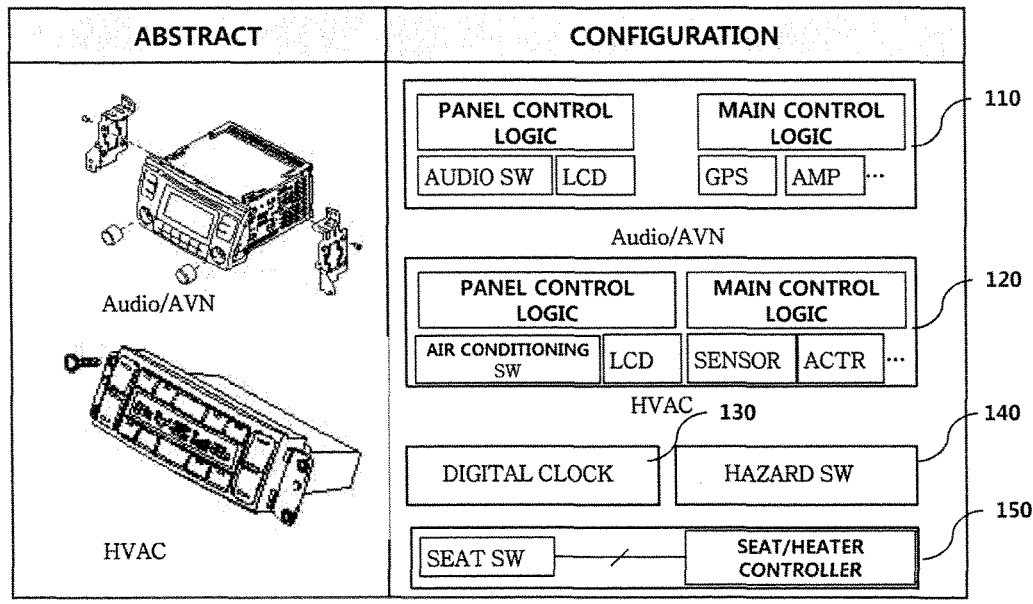
FIG. 2
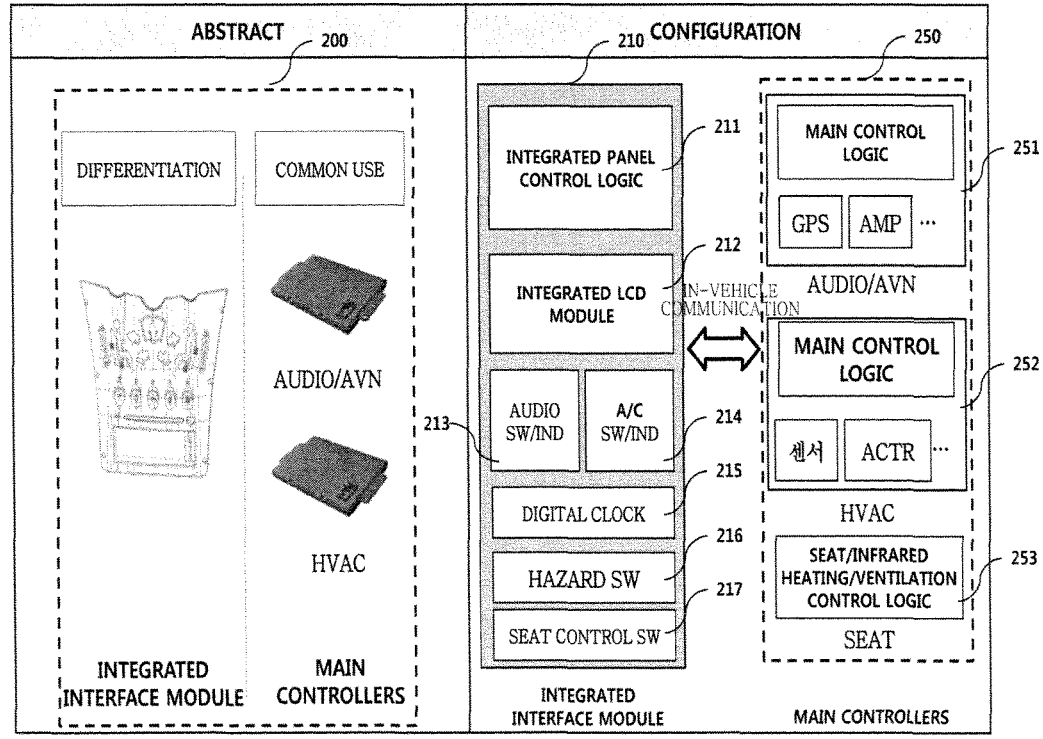

FIG. 5 --Related Art--
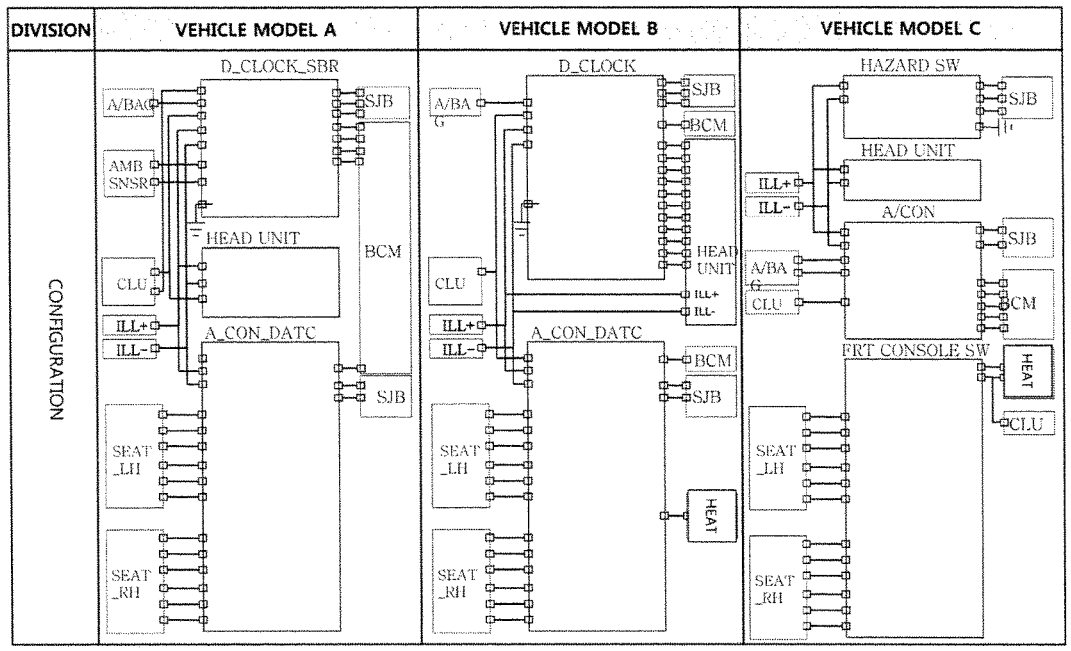
FIG. 6
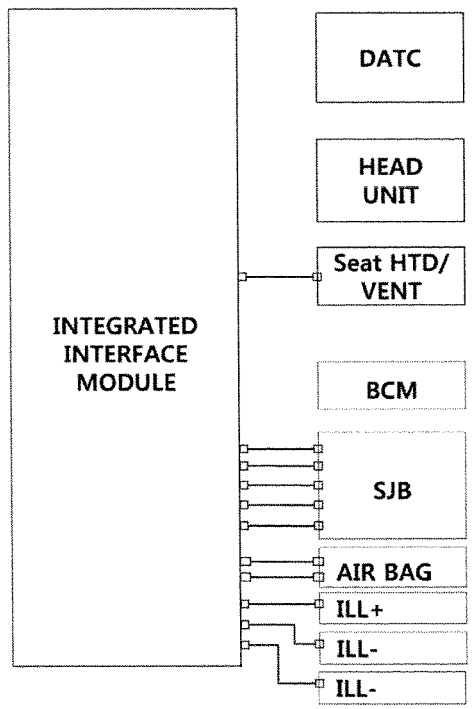

| SENSED SWITCH INPUT SIGNAL | SWITCH TYPE | INPUT SIGNAL CORRESPONDING TO SWITCH TYPE | OUTPUT SIGNAL |
|---|---|---|---|
| A/C ON | Hard Key Type | A/C ON=GND | C_ACOnSW = 1 |
| | Touch Sensing Type | Din=0x00F | |
| Audio On | Hard Key Type | Audio ON=GND | C_AudioOnSW = 1 |
| | Touch Sensing Type | Din=0x00A | |
| ... | ... | ... | ... |

METHOD AND APPARATUS FOR PROVIDING INTEGRATED INTERFACE IN CENTER FASCIA

CROSS-REFERENCE TO RELATED APPLICATION

This application claims the benefit of Korean Patent Application No. 10-2014-0146123, filed on Oct. 27, 2014, which is hereby incorporated by reference as if fully set forth herein.

TECHNICAL FIELD

The present disclosure relates to a method of providing an integrated interface in a center fascia, and more particularly, to a method and apparatus for providing an integrated interface in a center fascia capable of optimizing space and wiring by linking one integrated interface module in the center fascia.

BACKGROUND

Rapid development of information technology (IT) has greatly affected the automobile industry, and diverse IT has been applied in a vehicle.

In particular, a currently released vehicle has various devices for user convenience and various assistive devices for safe driving. Accordingly, a human machine interface (HMI) for control of the devices has been provided.

In general, a center fascia refers to a control panel part positioned between a driver seat and a passenger seat in a vehicle dashboard.

Various electronic control devices, such as an audio device, an air conditioning control device, a digital clock, a navigator, and the like are separately disposed in the center fascia.

In particular, the center fascia is provided with various user interface panels for control of an air conditioning device, an audio/navigator device, a liquid crystal display (LCD) device, and the like, and thus is a significantly important design factor in terms of user operation convenience and internal structure design of the vehicle.

Touch panels or full touchscreens instead of existing mechanical switches are applied to control panels of some of recently released vehicles.

However, a vehicle requires a differentiated interface for each region according to a cultural difference and an ability of a customer to adapt to a technology, and requires a flexible structural design for a control device to be additionally provided and an interface change due to the additionally provided control device.

When existing electronic devices such as an audio device, an air conditioning control device, a digital clock, a navigation device, and the like are independently installed in the vehicle, the inside of the center fascia may be significantly complicated, and thus, a package space may be insufficient.

Moreover, wiring for communication between the electronic devices is complicated, and thus, the number of assembly processes may increase.

In particular, an HMI configuration suitable for a design of each vehicle model is needed, and thus, development period and cost may increase.

An entirely integrated HMI module referred to as a center stack has been recently released. The center stack may improve the insufficient package space and the complex wiring. However, the center stack may not sufficiently satisfy various requirements for each vehicle model and region, and thus may not be commonly used.

SUMMARY

The present disclosure is directed to solve the above-mentioned problems of the related art.

An aspect of the present inventive concept provides a method and apparatus for providing an integrated interface in a center fascia having an expandable human machine interface (HMI).

Another aspect of the present inventive concept provides a method and apparatus for providing an integrated interface in a center fascia capable of optimizing a space and wiring by linking one integrated interface module in the center fascia to each of main controllers performing various control functions through a communication network in a vehicle.

Another aspect of the present inventive concept provides a method and apparatus for providing an integrated interface in a center fascia capable of providing differentiated HMI for each vehicle model/vehicle size class/region.

A further aspect of the present inventive concept provides a method and apparatus for providing an integrated interface in a center fascia capable of providing the degree of freedom of each of positions of main controllers in the center fascia.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present disclosure relates to a method and apparatus for providing an integrated interface in a vehicle center fascia.

In an exemplary embodiment of the present inventive concept, a method of providing an integrated interface in an HMI module in a vehicle includes sensing a switch input signal on a center fascia panel, identifying a switch type based on the sensed switch input signal. An input signal corresponding to the sensed switch input signal and the identified switch type, and an output signal corresponding to the identified input signal are identified. The identified output signal is transmitted to an associated main controller through a communication network in the vehicle.

The HMI module may correspond to one of a hard key module, a capacitive touch plate module, and a full touchscreen module.

The switch type may be one of a hard key type and a touch sensing type.

The communication network in the vehicle may be one of a controller area network (CAN) and Ethernet.

The main controller may be connected to and disconnected from the communication network in the vehicle through a designated interface terminal.

The main controller may include at least one of an AUDIO/audio video navigation (AUDIO/AVN) main controller, an air conditioning main controller, and a seat main controller.

The input signal corresponding to the sensed switch input signal and the output signal corresponding to the input signal may be identified by referring to a predefined standard signal mapping table.

A non-transitory computer-readable recording medium comprising computer executable instructions which cause a controller to perform the method.

In another exemplary embodiment of the present inventive concept, an apparatus for providing an integrated interface in a vehicle includes a switch input signal sensor configured to sense a switch input signal on a center fascia panel. A switch type identifier is configured to identify a switch type based on the sensed switch input signal. An input signal identifier is configured to identify an input signal corresponding to the sensed switch input signal and the identified switch type. An output signal identifier is configured to identify an output signal corresponding to the identified input signal and to transmit the identified output signal to an associated main controller through a communication network in the vehicle.

The apparatus may correspond to one of a hard key module, a capacitive touch plate module, and a full touch-screen module.

The switch type may be one of a hard key type and a touch sensing type.

The communication network in the vehicle may be one of a CAN and Ethernet.

The main controller may be connected to and disconnected from the communication network in the vehicle through a designated interface terminal.

The main controller may include at least one of an AUDIO/AVN main controller, an air conditioning main controller, and a seat main controller.

The main controller may be connected to the communication network in the vehicle in a shape of a slim crash pad.

The input signal corresponding to the sensed switch input signal and the output signal corresponding to the input signal may be identified by referring to a standard signal mapping table stored in advance.

In another exemplary embodiment of the present inventive concept, an integrated interface module for a vehicle includes first to nth interface switches, each of which is configured to sense a switch input signal on a center fascia panel. An integrated interface module controller is configured to identify a switch type based on the sensed switch input signal, to identify an input signal corresponding to the sensed switch input signal and the identified switch type, and to identify an output signal corresponding to the identified input signal. A CAN communicator is configured to transmit a CAN frame including the identified output signal.

The output signal corresponding to the sensed switch input signal may be identified by referring to a standard signal mapping table including standard signal mapping information for each switch input signal recorded therein.

It is to be understood that both the foregoing general description and the following detailed description of the present inventive concept are exemplary and explanatory and are intended to provide further explanation of the disclosure as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram illustrating a scheme for configuring interface modules in a center fascia according to the related art.

FIG. 2 is a diagram illustrating a scheme for configuring an integrated interface module in a center fascia according to an embodiment of the present inventive concept.

FIG. 5 is a diagram illustrating examples of configurations and wiring schemes of main controllers for vehicle models according to the related art.

FIG. 6 is a diagram illustrating an example of a wiring scheme using the integrated interface module according to the present inventive concept.

DETAILED DESCRIPTION

Figure 3:
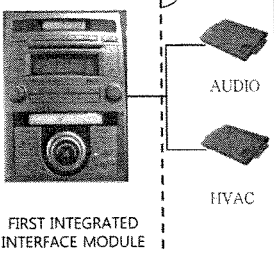
FIG. 3 is a diagram illustrating types of the integrated interface module in the center fascia according to the embodiment of the present inventive concept.

Reference will now be made in detail to the exemplary embodiments of the present inventive concept, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present inventive concept are described to be integrated into a single one or to be operated as a single one, the present inventive concept is not necessarily limited to such embodiments. According to embodiments, all of the elements may be selectively integrated into one or more and be operated as one or more within the object and the scope of the present inventive concept. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in a computer readable media such that the computer program is read and executed by a computer to implement embodiments of the present invention. Computer program storage media may include magnetic recording media, optical recording media, and carrier wave media.

The term "comprises," "includes," or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present disclosure, such terms are not interpreted as ideal or excessively formal meanings.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to," "coupled to," or "accessed to" another element, one element may be "connected to," "coupled to," or "accessed to" another element via a further element although one element may be directly connected to or directly accessed to another element.

FIG. 1 illustrates a scheme for configuring interface modules in a center fascia according to the related art.

Referring to FIG. 1, the center fascia interface modules according to the related art may include an AUDIO/audio video navigation (AUDIO/AVN) package 110, a heating ventilation air conditioning (HVAC) package 120, digital clock package 130, a hazard switch package 140, a seat switch package 150, and the like.

The AUDIO/AVN package 110 is a package for provision of a navigation function and a function of reproducing a multimedia such as audio, video, or the like. To this end, the AUDIO/AVN package 110 may include a panel control logic circuit, an audio switch, a liquid crystal display (LCD), a main control logic circuit, a global positioning system (GPS) receiver module, a speaker (or an amplifier), and the like.

The HVAC package 120 is a package for provision of air conditioning functions such as heating, ventilation, cooling, and the like in a vehicle. To this end, the HVAC package 120 may include a panel control logic circuit, an air conditioning switch, an liquid-crystal display (LCD), a temperature sensor, a main control logic circuit, an air conditioner actuator (ACTR), and the like.

The hazard switch package 140 provides a function of preventing an accident by relaying an emergency situation or a danger signal to a driver of another vehicle. The hazard switch package 140 is an essential package installed in every vehicle.

The seat switch package 150 is a package for control of a position of a vehicle seat or a seat heating system.

In view of the above description, the existing center fascia interface modules are configured as packages for respective functions and installed in the vehicle. Therefore, the inside of the center fascia is significantly complicated, and thus, a space thereof is insufficient to install the packages.

Moreover, the existing center fascia interface modules are wired on a package basis. Therefore, the center fascia has complex wiring therein, and the number of assembly processes increases.

FIG. 2 illustrates a scheme for configuring an integrated interface module in a center fascia according to an embodiment of the present inventive concept.

As illustrated in the box indicated by reference numeral 200, the present disclosure is characterized in that a differentiated center fascia user interface environment for each vehicle/vehicle size class/region may be provided using the integrated interface module in the center fascia.

In addition, the present disclosure includes different integrated interface modules commonly used since a main controller for control of various electronic control devices such as an audio device, a navigation device, a video reproduction device, an air conditioning control device, a digital clock, a vehicle seat control device, and the like is provided in a form of a slim crash pad.

An integrated interface module 210 may be linked to main controllers 250 via a communication network in a vehicle. Here, the communication network in the vehicle may employ a controller area network (CAN), Ethernet, or the like.

The integrated interface module 210 according to the present disclosure may include an integrated panel control logic 211 for integrated control of various panels, an integrated LCD module 212, an audio switch/indicator 213, an air conditioning switch/indicator 214, a digital clock 215, a hazard switch 216, a seat control switch 217, and the like.

Here, the integrated LCD module 212 may be implemented as one LCD by integrating an LCD that displays an audio reproduction state, a radio reproduction state, and the like, an LCD that displays navigation information, and an LCD that displays an air conditioning state. Alternatively, the LCDs may be configured on the integrated LCD module 212 such that the LCDs are adjacent to one another or at least one of the LCDs is separated from the remaining ones.

The seat control switch 217 is a switch to control infrared heating and ventilation of a vehicle seat or to control a position of the vehicle seat. In this instance, the switch to control infrared heating and ventilation, and the switch to control the position may be disposed at the same position or at positions separated from each other.

The main controllers 250 according to the present disclosure may include an audio main controller 251, an air conditioning main controller 252, a seat main controller 253, and the like. Each of the main controllers may have a form of a slim crash pad and be connected to and disconnected from a communication network in the vehicle through a designated interface terminal.

Therefore, another main controller in the center fascia may be additionally provided or removed according to a configuration of the integrated interface module 210. In addition, it is possible to freely change a position of a main controller in the center fascia of the vehicle according to an internal design of the vehicle.

FIG. 3 illustrates types of the integrated interface module 210 in the center fascia according to the embodiment of the present inventive concept.

Referring to FIG. 3, the types of the integrated interface module 210 according to the present invention may include a hard key module 310 corresponding to a human machine interface (HMI) scheme using a hard key, a capacitive touch plate module 320 in which a capacitive touchscreen is provided to a part of the integrated interface module 210, a full touchscreen module 330 in which the entire integrated interface module 210 is configured as a touchscreen, and the like.

It should be noted that when the integrated interface module 210 provides a user interface for control of the same function, the same specification may be applied to the main controllers 250. Therefore, the present disclosure may allow the main controllers 250 to be commonly used irrespective of the types of the integrated interface module 210.

Figure 4:
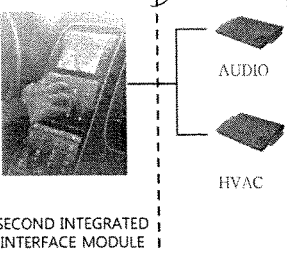
FIG. 4 is a diagram illustrating a scheme for configuring a package in the center fascia according to the present inventive concept.

FIG. 4 illustrates a scheme for configuring a package in the center fascia according to the present disclosure.

The center fascia interface modules according to the related art are configured on a package basis. As illustrated in the box indicated by reference numeral 410, when the center fascia interface modules are configured by connecting a first package 411 to a second package 412, an area of the center fascia interface modules exposed to the outside of the center fascia is proportional to a sum of panel sizes of the first package 411 and the second package 412. In addition, an occupied space in the center fascia is proportional to a sum of volumes of the first package 411 and the second package 412. According to the related art in which the first package 411 is connected to the second package 412, space efficiency in the center fascia is low in view of design.

On the other hand, the integrated interface module 210 according to the present disclosure may be installed separately from the main controllers 250, and thus, the degree of freedom of each of positions in which the main controllers 250 are installed may be increased. Therefore, the present disclosure efficiently uses the internal space of the center fascia. In particular, since the integrated interface module 210 is separated from the main controllers 250, an area exposed to the outside of the center fascia may be minimized and determined based only on a center fascia switch design.

FIG. 5 illustrates examples of configurations and wiring schemes of main controllers for vehicle models according to the related art.

FIG. 5 illustrates that a wiring structure of controllers is different between vehicle models, and thus, wiring is significantly complicated.

FIG. 6 illustrates an example of a wiring scheme using the integrated interface module 210 according to the present disclosure.

Referring to FIG. 6, in the present disclosure, the integrated interface module 210 is connected to the main controllers 250 via the communication network in the vehicle, and thus, a wiring structure is simple, and the degree of freedom of each of positions of the main controllers 250 in the center fascia increases. As a result, wiring may be optimized.

Figures 7, 8:
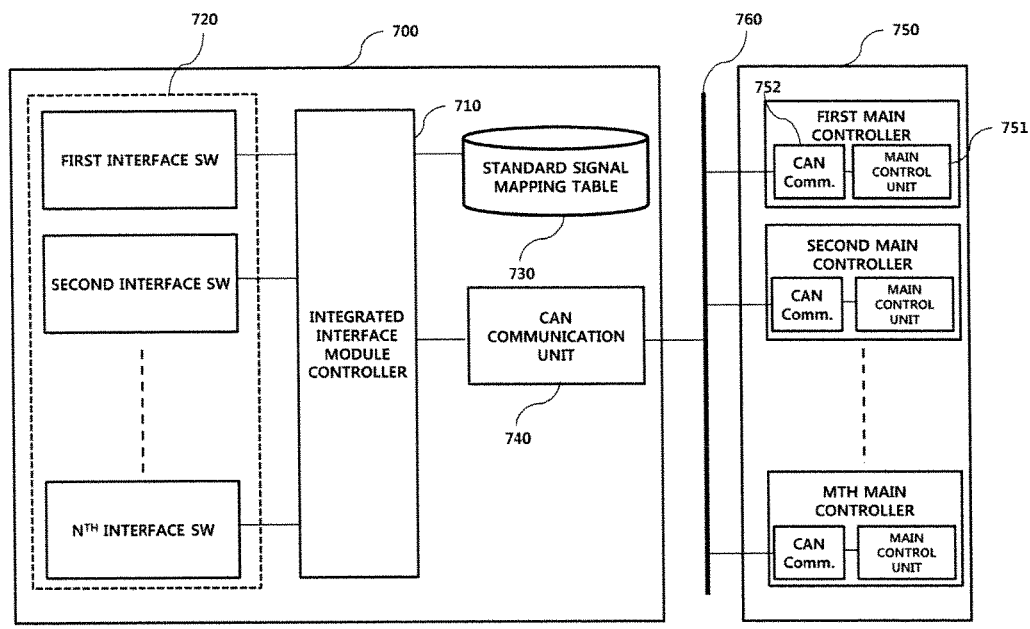
FIG. 7 is a block diagram illustrating an internal configuration of an integrated interface module according to an embodiment of the present inventive concept.
FIG. 8 is a standard signal mapping table according to an embodiment of the present inventive concept.

FIG. 7 illustrates an internal configuration of an integrated interface module according to an embodiment of the present inventive concept.

Referring to FIG. 7, the integrated interface module, denoted by reference numeral 700, may be linked to a main controller 750 through a controller area network (CAN) bus 760.

The integrated interface module 700 may include an integrated interface module controller 710, 1st to nth interface switches 720, a standard signal mapping table 730 and a CAN communicator 740.

Upon sensing a switch input, each of the first to nth interface switches 720 may deliver a certain control signal including a sensed switch input signal and a switch type identifier to the integrated interface module controller 710.

The integrated interface module controller 710 identifies an input signal mapped to the sensed switch input signal and the switch type identifier by referring to the standard signal mapping table 730, and generates an output signal corresponding to the identified input signal. Then, the integrated interface module controller 710 delivers the generated output signal to the CAN communicator 740.

The CAN communicator 740 generates a CAN frame including the output signal which is delivered from the integrated interface module controller 710, and transmits the generated CAN frame on the CAN bus 760.

The main controller 750 may verify whether the CAN frame carried on the CAN bus 760 is a frame for the main controller 750. When the CAN frame is verified as a frame for the main controller 750, the main controller 750 may control an associated electronic control device based on the output signal which is included in the CAN frame.

The main controller 750 may include a first main controller to an Mth main controller. Each of the main controllers may include a CAN communication unit 752 and a main control unit 751. Here, the CAN communication unit 752 of each of the main controllers may verify whether the CAN frame carried on the CAN bus 760 is a CAN frame for the CAN communication unit 752. When the CAN frame is verified as a frame for the CAN communication unit 752, the CAN communication unit 752 may extract the output signal included in the CAN frame, and deliver the extracted output signal to the main control unit 751. Then, the main control unit 751 may control an associated electronic control device based on the delivered output signal.

FIG. 8 illustrates the standard signal mapping table 730 according to the present disclosure.

Referring to FIG. 8, the standard signal mapping table 730 may include a sensed switch input signal field 731, a switch type field 732, an input signal field 733 corresponding to a switch type, and an output signal field 734.

For example, when a sensed switch input signal corresponds to air conditioning (A/C) ON for driving a vehicle air conditioner, the switch type may be identified as one of a hard key type and a touch sensing type. In this instance, each of output signals corresponding to the identified hard key type and touch sensing type may have a C_ACOnSW value set to 1.

In the above example, the output signals corresponding to the identified switch types are the same irrespective of the switch types, which is merely an example. In another embodiment of the present inventive concept, an output signal different for each switch type may be defined according to a control logic and a standard signal definition between the integrated interface module 700 and the main controller 750.

Figure 9:
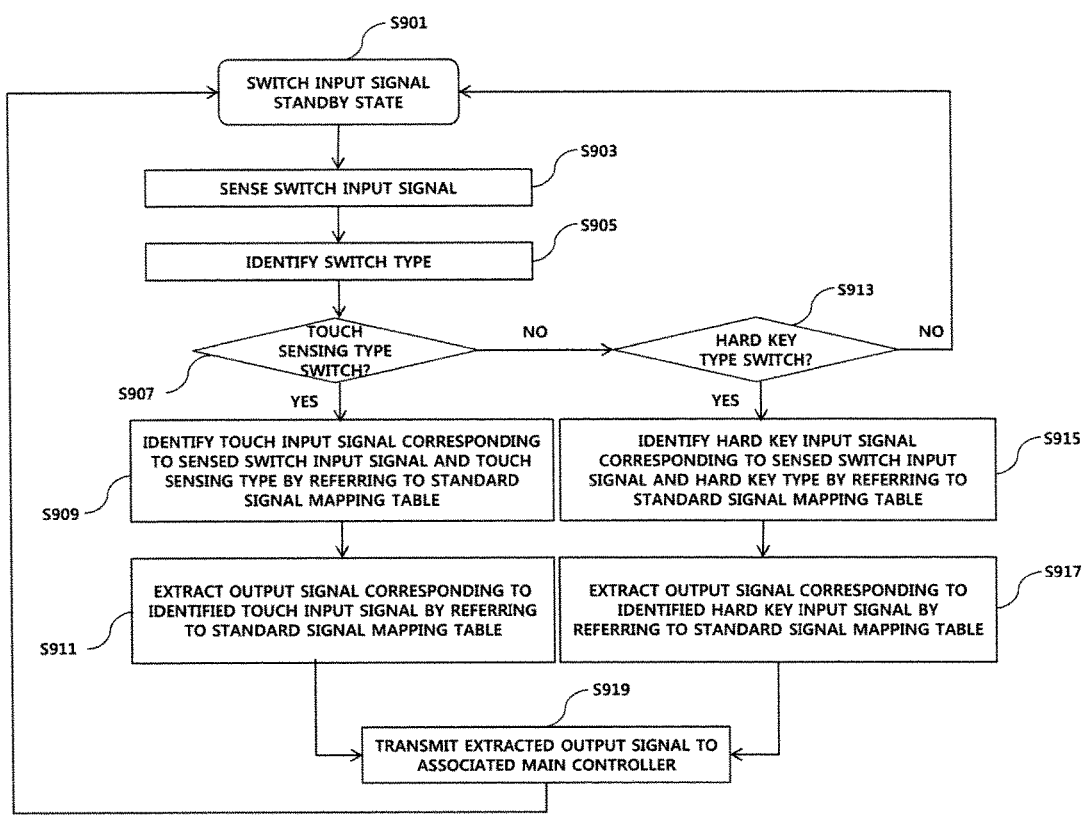
FIG. 9 is a flowchart illustrating a scheme of controlling a panel in the integrated interface module according to an embodiment of the present inventive concept.

FIG. 9 illustrates a scheme of controlling a panel in the integrated interface module 700 according to the present disclosure.

Referring to FIG. 9, upon sensing a switch input signal in a switch input signal standby state, the integrated interface module 700 identifies a switch type corresponding to the sensed switch input signal in S901 to S905.

Subsequently, in S907, the integrated interface module 700 verifies whether the identified switch type is a touch sensing type.

When the identified switch type is the touch sensing type as a result of verification, the integrated interface module 700 identifies a touch input signal corresponding to the sensed switch input signal and the identified touch sensing type by referring to the standard signal mapping table 730 stored in advance in S909.

Subsequently, in S911, the integrated interface module 700 extracts an output signal corresponding to the identified touch input signal by referring to the standard signal mapping table 730.

In S919, the integrated interface module 700 transmits the extracted output signal to an associated main controller. As an example, the extracted output signal may be configured as a CAN frame and transmitted on a CAN bus. As another example, the extracted output signal may be configured as an Internet protocol (IP) packet, and then, transmitted to the main controller through an Ethernet network.

When the identified switch type is not the touch sensing type in S907, the integrated interface module 700 verifies whether the identified switch type is a hard key type in S913.

When the identified switch type is the hard key type as a result of verification, the integrated interface module 700 identifies a hard key input signal corresponding to the sensed switch input signal and the identified hard key type by referring to the standard signal mapping table 730 stored in advance in S915.

Subsequently, in S917, the integrated interface module 700 extracts an output signal corresponding to the identified hard key input signal by referring to the standard signal mapping table 730.

In S919, the integrated interface module 700 transmits the extracted output signal to the main controller.

According to the above-described panel control logic of the present disclosure, a standardized output signal may be transmitted to the main controller irrespective of a vehicle option/specification by predefining an input signal corresponding to each switch input signal and switch type and an output signal corresponding to the input signal in the standard signal mapping table 730.

In the above description, CAN communication or vehicle Ethernet is used to exchange a signal between the integrated interface module 700 and the main controller 750, which is merely an example. It should be noted that the present invention may be implemented using Flexlay communication, local interconnect network (LIN) communication, wireless fidelity (Wi-Fi) communication, or the like.

Effects of a method and an apparatus according to the present disclosure are described below.

First, the present disclosure has an advantage of providing a method and apparatus for providing an integrated interface in a center fascia having an expandable HMI.

Second, the present disclosure has an advantage of providing a method and apparatus for providing an integrated interface in a center fascia capable of optimizing space and wiring by linking one integrated interface module in the center fascia to each of main controllers performing various control functions through a communication network in a vehicle.

Third, the present disclosure may enhance customer satisfaction by providing a differentiated HMI for each vehicle model/vehicle size class/region using an integrated interface in a center fascia.

Fourth, the present disclosure has an advantage of enhancing space efficiency in a center fascia by increasing the degree of freedom of each of positions of main controllers in the center fascia.

Fifth, the present disclosure has an advantage of differentiating the design and HMI while using existing main controllers since an HMI scheme desired by a customer may be selected by changing an integrated interface module.

Sixth, the present disclosure provides a standardized interface between a control panel and a main controller, thereby using existing main controllers irrespective of change of the control panel and reducing development period and material cost.

Those skilled in the art will appreciate that the present disclosure may be carried out in other specific ways than those set forth herein without departing from the spirit and essential characteristics of the present disclosure.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of providing an integrated interface in a vehicle having a human machine interface (HMI) module, the method comprising steps of:
    sensing, by interface switches, a switch input signal on the HMI module;
    identifying, by an integrated interface module controller, a switch type corresponding to the sensed switch input signal by referring to a standard signal mapping table stored in advance;
    identifying an input signal corresponding to the sensed switch input signal and the identified switch type;
    identifying, by the integrated interface module controller, an output signal corresponding to the identified input signal;
    determining, by the integrated interface module controller, a main controller corresponding to the identified output signal; and
    transmitting, by the integrated interface module controller, the identified output signal to the determined main controller through an in-vehicle communication network corresponding to the determined main controller,
    wherein the switch type is selected from among a hard key type and a touch sensing type.

2. The method according to claim 1, wherein the HMI module corresponding to the touch sensing type includes at least one of, a capacitive touch plate, and a full touchscreen.

3. The method according to claim 1, wherein the in-vehicle communication network in the vehicle is one of a controller area network (CAN) and an Ethernet.

4. The method according to claim 1, wherein the main controller is a form of a slim crash pad and connected to and disconnected from the in-vehicle communication network through a designated interface terminal.

5. The method according to claim 1, wherein the main controller includes at least one of an audio main controller, an audio video navigation main controller, an air conditioning main controller, a seat main controller and a heater main controller.

6. A non-transitory computer-readable recording medium comprising computer executable instructions which cause a controller to perform the method according to claim 1.

7. An apparatus for providing an integrated interface in a vehicle having a human machine interface (HMI) module, the apparatus comprising:
    a switch input signal sensor configured to sense a switch input signal on the HMI module;
    a switch type identifier configured to identify a switch type based on the sensed switch input signal by referring to a standard signal mapping table stored in advance;
    an input signal identifier configured to identify an input signal corresponding to the identified switch type by referring to a standard signal mapping table;
    an output signal identifier configured to identify an output signal corresponding to the identified input signal by referring to a standard signal mapping table; and
    a main controller identifier configured to determine a main controller corresponding to the identified output signal, and transmit the identified output signal to the determined main controller through an in-vehicle communication network corresponding to the determined main controller,
    wherein the switch type is selected from among a hard key type and a touch sensing type.

8. The apparatus of claim 7, wherein the HMI module corresponding to the touch sensing type includes at least one of a capacitive touch plate, and a full touchscreen.

9. The apparatus of claim 7, wherein the in-vehicle communication network is one of a controller area network (CAN) and an Ethernet.

10. The apparatus of claim 7, wherein the main controller is connected to and disconnected from the in-vehicle communication network through a designated interface terminal.

11. The apparatus of claim 7, wherein the main controller includes at least one of an audio main controller, an audio video navigation main controller, an air conditioning main controller, a seat main controller and an heating main controller.

12. The apparatus of claim 7, wherein the main controller has a form of a slim crash pad.

13. An integrated interface module for a vehicle, comprising:
   interface switches, each of which is configured to sense a switch input signal on a center fascia panel;
   an integrated interface module controller configured to identify a switch type based on the sensed switch input signal, to identify an input signal corresponding to the sensed switch input signal and the identified switch type by referring to a standard signal mapping table, to identify an output signal corresponding to the identified input signal by referring to the standard signal mapping table, and to determine a main controller corresponding to the identified output signal; and
   a controller area network (CAN) communicator configured to transmit a CAN frame including the identified output signal,
   wherein the switch type is selected from among a hard key type and a touch sensing type.

* * * * *